United States Patent
Rattray et al.

(10) Patent No.: US 12,292,778 B2
(45) Date of Patent: May 6, 2025

(54) POWER MANAGEMENT IN AUDIO SYSTEMS

(71) Applicant: Cirrus Logic International Semiconductor Ltd., Edinburgh (GB)

(72) Inventors: Chris Rattray, Newbury (GB); Zhengyi Xu, Fleet (GB); Miles K. Roberto, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 98 days.

(21) Appl. No.: 18/320,415

(22) Filed: May 19, 2023

(65) Prior Publication Data
US 2024/0385675 A1    Nov. 21, 2024

(51) Int. Cl.
| | | |
|---|---|---|
| *G06F 1/32* | (2019.01) | |
| *G06F 1/3206* | (2019.01) | |
| *G06F 1/3234* | (2019.01) | |
| *H04R 3/00* | (2006.01) | |

(52) U.S. Cl.
CPC .......... *G06F 1/3243* (2013.01); *G06F 1/3206* (2013.01); *H04R 3/007* (2013.01)

(58) Field of Classification Search
None
See application file for complete search history.

(56) References Cited

U.S. PATENT DOCUMENTS

| | | | |
|---|---|---|---|
| 2004/0022393 A1* | 2/2004 | Jones | H04R 3/00 381/56 |
| 2014/0270259 A1 | 9/2014 | Goertz et al. | |
| 2015/0356982 A1* | 12/2015 | Chesney | G10L 25/78 704/275 |
| 2017/0094408 A1* | 3/2017 | Napoli | H03G 3/20 |
| 2020/0059241 A1 | 2/2020 | Perrott | |
| 2020/0296513 A1 | 9/2020 | Littrell et al. | |
| 2021/0120351 A1 | 4/2021 | Zhao et al. | |
| 2023/0061200 A1* | 3/2023 | Wasada | G06F 21/44 |

FOREIGN PATENT DOCUMENTS

EP        3082013 A1    10/2016

OTHER PUBLICATIONS

Partial International Search Report and Provisional Opinion Accompanying the Partial Search Result, International Application No. PCT/EP2024/054496, mailed Apr. 30, 2024.

* cited by examiner

*Primary Examiner* — Nitin C Patel
(74) *Attorney, Agent, or Firm* — Jackson Walker L.L.P.

(57) ABSTRACT

A power management system for managing power consumption of a digital signal processor (DSP) that implements a protection system, the power management system comprising: a power management block configured to: detect a parameter indicative of a power of an input signal to the DSP; compare the detected parameter to a threshold; and responsive to a determination that the detected parameter is less than the threshold, cause one or more processing blocks of the DSP to enter a low power mode of operation.

22 Claims, 8 Drawing Sheets

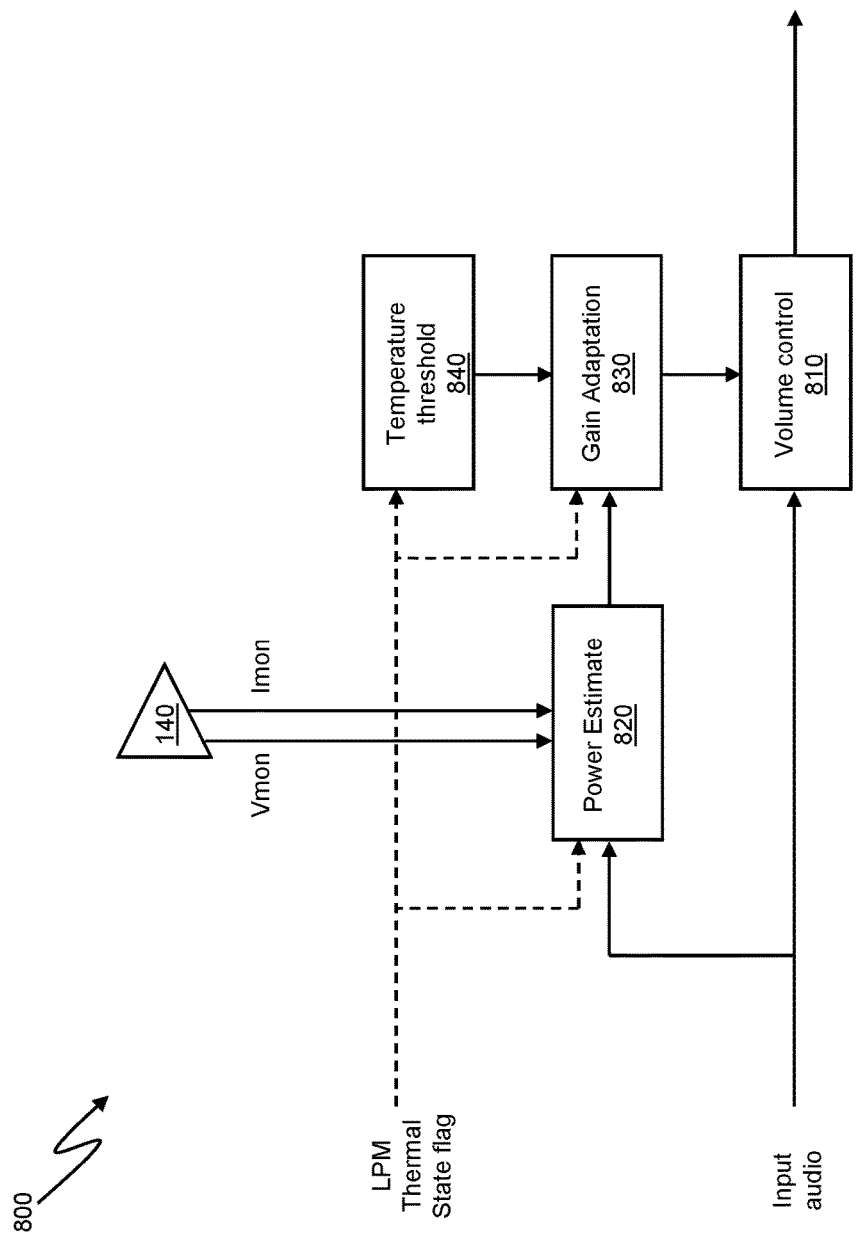

POWER MANAGEMENT IN AUDIO SYSTEMS

FIELD OF THE INVENTION

The present disclosure relates to power management in audio systems, and in particular to power management in audio systems that include a digital signal processor (DSP) that implements a protection system such as a speaker protection system and/or a battery protection system.

BACKGROUND

Many audio systems include a digital signal processor (DSP) for processing one or more digital audio signals to generate an output audio signal that can be supplied to an output stage (e.g. an audio amplifier) which drives an output transducer such as a speaker, headphone, earphone or the like. In many audio systems the DSP is also configured to implement a speaker protection system to protect the output transducer and/or a battery that supplies power to the audio system from potentially damaging conditions such as speaker cone over-excursion, excessive heating of a voice coil or excessive battery drain.

FIG. 1 is a schematic representation of an example audio system. The audio system, shown generally at 100 in FIG. 1, includes a DSP 110 configured to receive one or more input digital audio signals (in this example the DSP 110 is configured to receive two input digital audio signals representing left and right audio channels) and to output a digital output signal to an input of a digital to analog converter (DAC) 130. An output of the DAC 130 is coupled to an input of an amplifier 140. The amplifier 140 may be, for example, a Class D amplifier. Outputs of the amplifier 140 are coupled to inputs of a speaker 150, such that the amplifier 140 drives the speaker 150 with an amplified audio signal.

The DSP 110 in this example is configured to implement a speaker protection system of the kind described above. The DSP 110 includes a plurality of distinct processing blocks, each configured to perform a particular function. In the example illustrated in FIG. 1, the DSP 110 may include an audio enhancement or conditioning block 112, for enhancing or conditioning the input digital audio signal(s). The DSP 110 in the illustrated example further includes an excursion protection block 114 configured to protect the speaker 150 from excessive excursion, a thermal protection block 116 configured to protect the speaker 150 from excessive voice coil temperatures, a battery protection block 118 configured to protect a battery that powers the audio system 100 from excessive voltage or current conditions, and a power optimiser block 120 configured to perform functions such as dynamic range compression based on parameters such as temperature and input signal level. The DSP 110 may include other processing blocks, represented in FIG. 1 by block 122. As will be appreciated by those of ordinary skill in the art, the DSP 110 may include more or fewer processing blocks, or different processing blocks than those shown in FIG. 1. The processing blocks 112-122 may be configured to perform processing in the time domain or in the frequency domain. Further, the processing blocks 112-122 may be configured to perform processing on full-band signals (i.e. on the full bandwidth of an input digital audio signal) or on sub-band signals (i.e. signals comprising components of an input digital audio signal in a limited frequency band of the full bandwidth of the input digital audio signal). Where a processing block 112-122 is configured to perform sub-band processing, that processing block 112-122 may comprise a plurality of parallel sub-blocks, each configured to process a particular sub-band signal of the input digital audio signal.

Each of the processing blocks 112-122 of the DSP 110 consumes power while the DSP 110 is active. At low input signal levels (e.g. when the amplitude of the input audio signal(s) is low), the power consumption of the amplifier 140 may be comparable to or lower than the power consumption of the DSP 110.

SUMMARY

According to a first aspect, the invention provides a power management system for managing power consumption of a digital signal processor (DSP) that implements a protection system, the power management system comprising: a power management block configured to: detect a parameter indicative of a power of an input signal to the DSP; compare the detected parameter to a threshold; and responsive to a determination that the detected parameter is less than the threshold, cause one or more processing blocks of the DSP to enter a low power mode of operation.

The power management block may be configured to detect a peak power of the input signal.

The power management block may be configured to compare a signal indicative of the peak power of the input signal to a first threshold and, responsive to a determination that the peak power of the input signal is less than the first threshold, cause an excursion protection block to enter a low power mode of operation.

In the low power mode, one or more feedforward processing blocks and/or one or more feedback processing blocks of the excursion protection block may be disabled.

In the low power mode, a processing rate of one or more feedforward processing blocks and/or one or more feedback processing blocks of the excursion protection block may be reduced.

The power management block may be configured to compare a signal indicative of the peak power of the input signal to a first threshold and, responsive to a determination that the peak power of the input signal is less than the first threshold, cause a battery protection block to enter a low power mode of operation.

In the low power mode, one or more feedback processing blocks of the battery protection block may be disabled.

In the low power mode, a processing rate of one or more feedback processing blocks of the battery protection block may be reduced.

The power management block may be configured to detect a mean power of the input signal.

The power management block may be configured to compare a signal indicative of the mean power of the input signal to a second threshold and, responsive to a determination that the mean power of the input signal is less than the second threshold, cause the thermal protection block to enter a low power mode of operation.

In the low power mode, one or more feedback processing blocks of the thermal protection block may be disabled.

In the low power mode, a processing rate of one or more feedback processing blocks of the thermal protection block may be reduced.

The power management block may be configured to compare a signal indicative of the peak power of the input signal to a first threshold and, responsive to a determination that the peak power of the input signal is less than the first threshold, cause a power optimiser block and/or a power limiter system block of the DSP to enter a low power mode of operation.

The DSP may comprise a main audio signal chain, and operation of the main audio signal chain may be unaffected by the power management block.

The DSP may comprise the power management block.

The parameter may be based, at least in part, on a level of a level of the input signal.

The parameter may be based, at least in part, on a volume setting of a host device incorporating the power management system.

The DSP may be configured to implement a speaker protection system and/or a battery protection system.

According to a second aspect, the invention provides an integrated circuit comprising the power management system of the first aspect.

According to a third aspect, the invention provides a host device comprising the power management system of the first aspect.

The host device may comprise a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

According to a fourth aspect, the invention provides a digital signal processor (DSP) comprising: an excursion protection block; a battery protection block; a thermal protection block; and a power management block, wherein the power management block is configured to: monitor a peak power and a mean power of an input signal to the DSP; control a mode of operation of the excursion protection block and/or the battery protection block based on the peak power of the input signal; and control a mode of operation of the thermal protection block based on the mean power of the input signal.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the invention will now be described, strictly by way of example only, with reference to the accompanying drawings, of which:

FIG. 8 is a schematic representation of a volume control block whose operation can be controlled or adjusted based on an output of a power management system according to the present disclosure.

DETAILED DESCRIPTION

Figure 1:
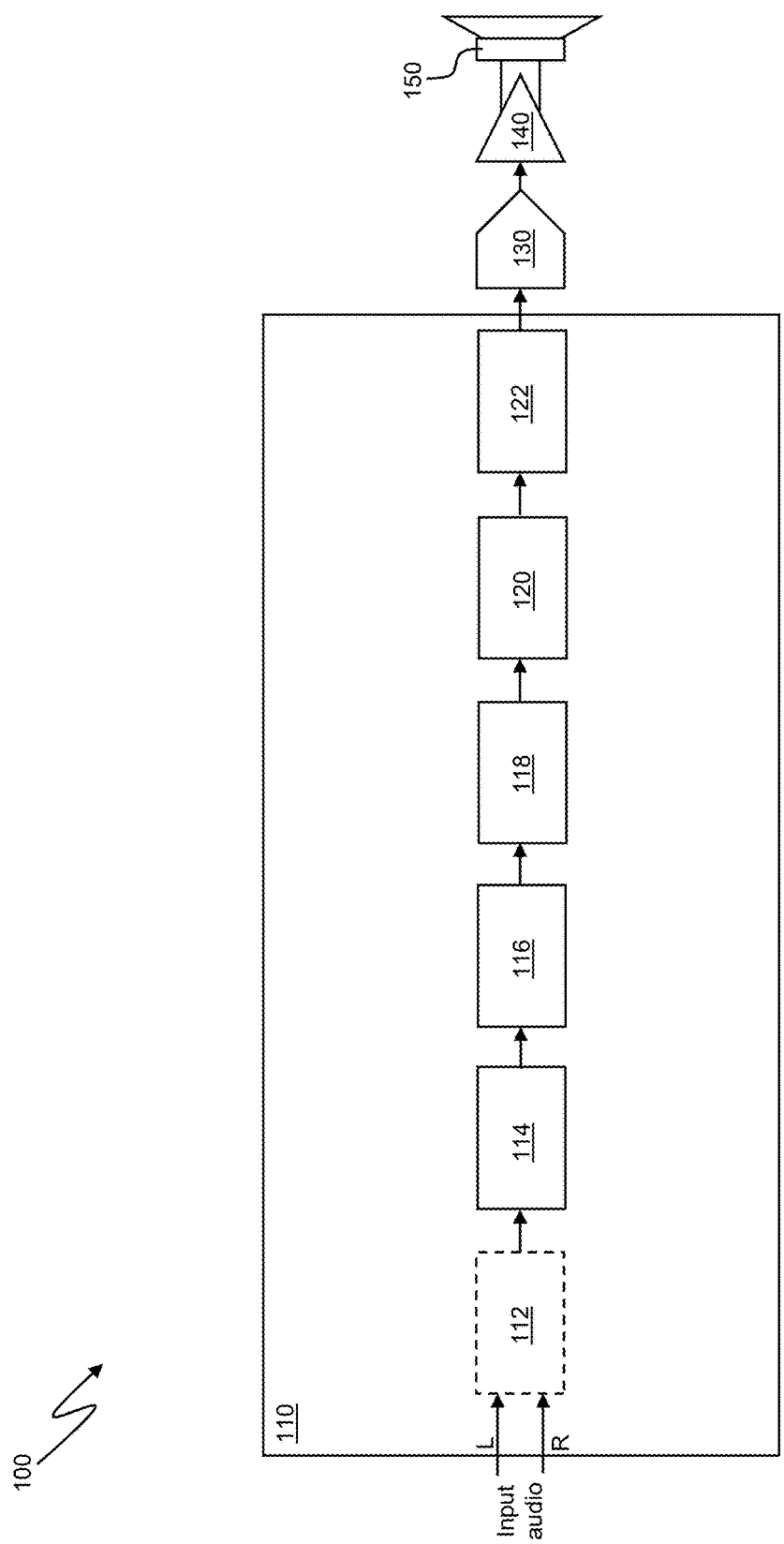
FIG. 1 is a schematic representation of an example audio system.
Figure 2:
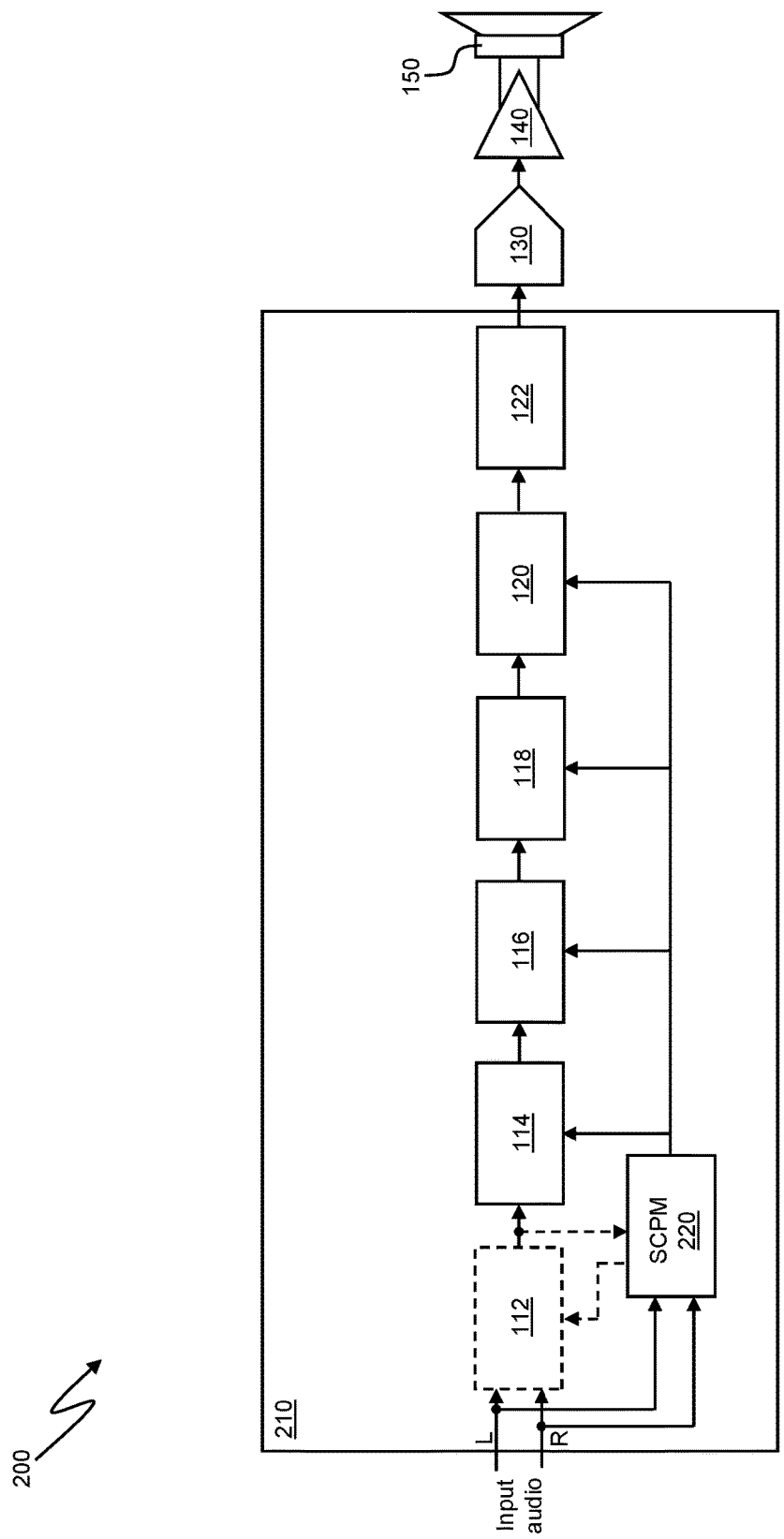
FIG. 2 is a schematic representation of an example audio system incorporating a power management system according to the present disclosure.

FIG. 2 is a schematic representation of an example audio system incorporating a power management system according to the present disclosure. The audio system, shown generally at 200 in FIG. 2, includes a DSP 210 which is similar to the DSP 110 of the audio system 100 of FIG. 1, in that it is configured to implement a speaker protection system of the kind described above, and has processing blocks 112-122 of the kind described above with reference to FIG. 1.

The DSP 210 differs from the DSP 110 of FIG. 1 in that it includes a power management system for managing power consumption of the DSP 210. The power management system comprises a power management block 220 (which may also be referred to as a signal chain power management or SCPM block 220).

The SCPM block 220 is configured to receive input signal(s), which may be either "raw" audio input signals received at input(s) of the DSP 210, or enhanced or conditioned versions of the raw audio input signals output by the audio enhancement or conditioning block 112, if present. The SCPM block 220 is further configured to detect a parameter indicative of a power of the input signal(s), and to control operation (e.g. a mode of operation) of one or more of the processing blocks 112-122 of the DSP 210 based, at least in part, on the detected parameter. In particular, the SCPM block 220 is configured to compare the detected parameter indicative of the power of the input signal(s) to a threshold, and, responsive to a determination that the detected parameter is less than the threshold, cause one or more of the processing blocks 112-122 of the DSP 210 to enter a low power mode of operation.

Figure 3:
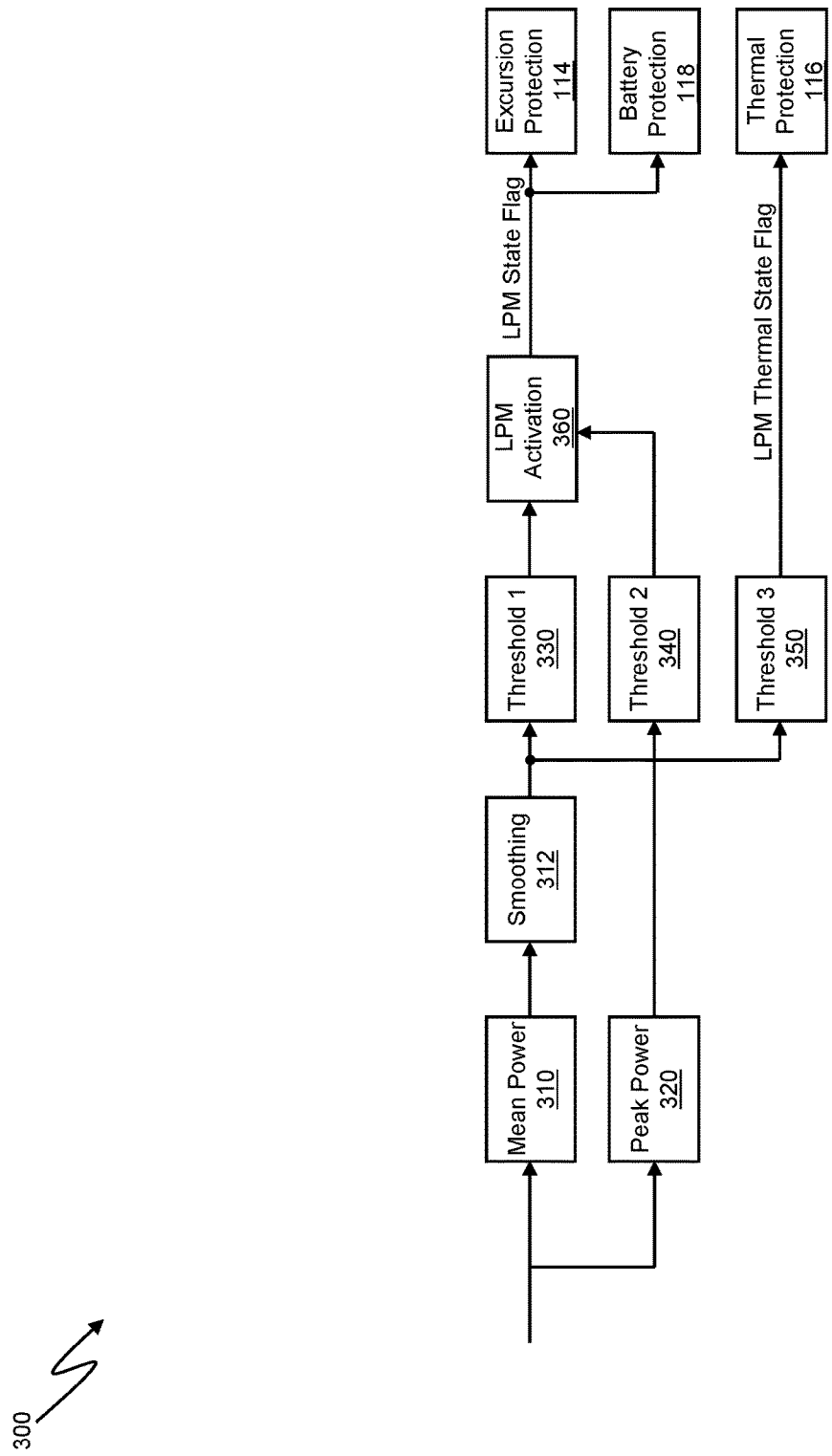
FIG. 3 is a schematic representation of an example power management block of a power management system according to the present disclosure.

FIG. 3 is a schematic representation of an example power management block suitable for use as the SCPM block 220 in the DSP 210 of FIG. 2.

The power management block, shown generally at 300 in FIG. 3, includes a mean power estimation block 310 configured to generate an estimate of a mean power of an input signal received at the input of the DSP 210. For example, the mean power estimation block may generate an estimate of a mean squared power of the input signal. The mean power estimation block 310 outputs a signal indicative of the mean power estimate to a smoothing block 312 which generates and outputs a signal indicative of a smoothed mean power estimate. The estimate of the mean power of the input signal may be based on the input signal level, or alternatively may be based on a combination of parameters, e.g. a combination of the input signal level and a volume setting of a host device incorporating the DSP 210.

The power management block 300 further includes a peak power estimation block 320 configured to generate an estimate of a peak power of an input signal received at the input of the DSP 210. The peak power estimation block 320 outputs a signal indicative of the peak power estimate. Again, the estimate of the peak power of the input signal may be based on the input signal level, or alternatively may be based on a combination of parameters, e.g. a combination of the input signal level and a volume setting of a host device incorporating the DSP 210.

The power management block 300 further includes first, second and third threshold logic blocks 330, 340, 350.

The first threshold logic block 330 is configured to receive the signal indicative of the smoothed mean power estimate from the smoothing block 312, and to compare this received signal to a first threshold to generate a first threshold logic block output signal. If the signal indicative of the smoothed mean power estimate is less than the first threshold, the first threshold logic block output signal adopts a first state (e.g. a logic low state), whereas if the signal indicative of the smoothed mean power estimate is equal to or greater than the first threshold, the first threshold logic block output signal adopts a second state (e.g. a logic high state).

The first threshold logic block 330 may implement hysteresis (in a manner that will be familiar to those of ordinary skill in the art), such that a threshold that determines whether the first threshold logic block output signal should transition from the first state to the second state is different from (e.g. lower than) a threshold that determines whether the first threshold logic block output signal should transition from the second state to the first state. The use of hysteresis in this way helps to prevent the first threshold logic block output signal from transitioning between the first and second states in response to transient changes in the smoothed mean power estimate signal.

The first threshold logic block output signal is output to a first input of a low power mode activation block 360.

The second threshold logic block 340 is configured to receive the signal indicative of the peak power estimate from the peak power estimation block 320, and to compare this received signal to a second threshold to generate a second threshold logic block output signal. If the signal indicative of the peak power estimate is less than the second threshold, the second threshold logic block output signal adopts a first state (e.g. a logic low state), whereas if the signal indicative of the peak power estimate is equal to or greater than the second threshold, the second threshold logic block output signal adopts a second state (e.g. a logic high state).

Like the first threshold logic block 330, the second threshold logic block 340 may implement hysteresis (again in a manner that will be familiar to those of ordinary skill in the art), such that a threshold that determines whether the second threshold logic block output signal should transition from the first state to the second state is different from (e.g. lower than) a threshold that determines whether the second threshold logic block output signal should transition from the second state to the first state. Again, the use of hysteresis in this way helps to prevent the second threshold logic block output signal from transitioning between the first and second states in response to transient changes in the peak power estimate signal.

The second threshold logic block output signal is output to a second input of the low power mode activation block 360.

The low power mode activation block 360 in this example is configured to perform a logic OR operation on the first threshold logic block output signal and the second threshold logic block output signal, and to assert or de-assert a low power mode state flag based on the result of this operation. Thus, in this example, if both the first threshold logic block output signal and the second threshold logic block output signal are in the first state (e.g. are both at a logic low level), the low power mode state flag is asserted, whereas if either the first threshold logic block output signal or the second threshold logic block output signal is in the second state (e.g. is at a logic high level), the low power mode state flag is de-asserted. Operation of the excursion protection block 114 and the battery protection block 118 of the DSP 210 is controlled or adjusted based on the state (asserted or de-asserted) of the low power mode state flag, as will be described in more detail below. Operation of other blocks of the DSP may also be controlled based on the state of the low power mode state flag, as will also be described in more detail below.

The third threshold logic block 350 is configured to receive the signal indicative of the mean power estimate from the smoothing block 312, to compare this received signal to a third threshold, and to control a state (asserted or de-asserted) of a low power mode thermal state flag based on the result of the comparison. If the signal indicative of the mean power estimate is less than the threshold, the low power mode thermal state flag is asserted, whereas if the signal indicative of the mean power estimate is equal to or greater than the third threshold, the low power mode thermal state flag is de-asserted.

Like the first and second threshold logic blocks 330, 340, the third threshold logic block 350 may implement hysteresis (again in a manner that will be familiar to those of ordinary skill in the art), such that a threshold that determines whether the low power mode thermal state flag should transition from the asserted state to the de-asserted state is different from (e.g. lower than) a threshold that determines whether the low power mode thermal state flag should transition from the asserted state to the de-asserted state. Again, the use of hysteresis in this way helps to prevent the third threshold logic block output signal from transitioning between the de-asserted and asserted states in response to transient changes in the mean power estimate signal.

The third threshold logic block output signal is output to the thermal protection block 116 of the DSP 210. Operation of the thermal protection block 116 is controlled or adjusted based on the state of the low power mode thermal state flag, as will be described in more detail below.

Figure 4:
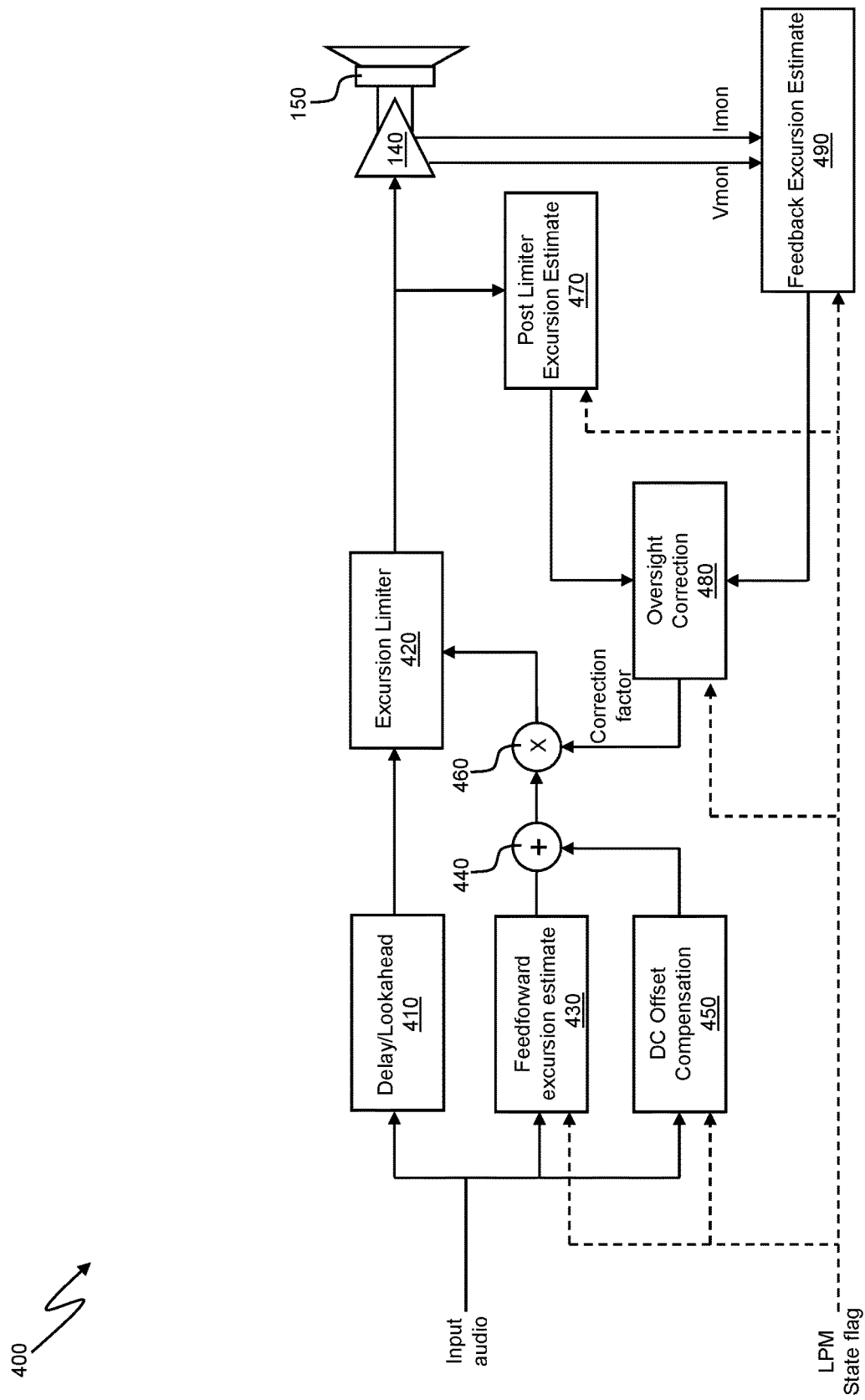
FIG. 4 is a schematic representation of an excursion protection block whose operation can be controlled or adjusted based on an output of a power management system according to the present disclosure.

FIG. 4 is a schematic representation of an excursion protection block suitable for use as the excursion protection block 114 in the DSP 210 of FIG. 2, such that the operation of the excursion protection block can be controlled or adjusted by the SCPM block 220.

The excursion protection block, shown generally at 400 in FIG. 4, comprises, in this example, an audio signal path comprising a delay/lookahead block 410 and an excursion limiter block 420.

The delay/lookahead block 410 is configured to receive an input audio signal and to apply a delay of sufficient duration to enable feedforward processing in first and second feedforward paths of the excursion protection block 400, as will be described in more detail below.

The excursion limiter block 420 is configured to receive the delayed input audio signal and apply excursion limitation processing, based on outputs of the first and second feedforward paths, and outputs of first and second feedback paths, as will be described in more detail below.

The first feedforward path comprises a feedforward excursion estimator block 430 configured to receive an input audio signal and to generate, based on the input audio signal, a feedforward excursion estimator block output signal indicative of an estimate of an excursion of a cone of the speaker 150. An output of the feedforward excursion estimator block 430 is coupled to a first input of an adder block 440.

The second feedforward path comprises a DC offset compensation block 450 configured to receive the input audio signal and to generate DC offset compensation signal. An output of the DC offset compensation block 450 is coupled to a second input of the adder block 440.

The feedforward excursion estimator block 430 and DC offset compensation block 450 thus constitute feedforward processing blocks of the excursion protection block 400.

The adder block 440 is configured to add the feedforward excursion estimator block output signal and the DC offset compensation signal and to output a sum signal to a first input of a multiplier block 460.

The excursion protection block 400 further includes a first feedback path comprising a post limiter excursion estimator block 470, which is configured to generate a post limiter excursion estimator block output signal indicative of an estimate of the excursion of the cone of the speaker 150 after limitation has been applied by the excursion limiter block 420. An output of the post limiter excursion estimator block 470 is coupled to a first input of an oversight correction block 480.

The excursion protection block 400 further includes a second feedback path including a feedback excursion estimator block 490 configured to receive feedback signals (e.g. monitored voltage and/or current signals) from the amplifier 140 and to generate an excursion estimate signal indicative of the actual excursion of the cone of the speaker 150. An output of the feedback excursion estimator block 490 is coupled to a second input of the oversight correction block 480.

The post limiter excursion estimator block 470, feedback excursion estimator block 490 and the oversight correction block 480 thus constitute feedback processing blocks of the excursion protection block 400.

The oversight correction block is configured to generate a correction factor signal based on the excursion estimate signal output by the feedback excursion estimator block 490 and the post limiter excursion estimator block output signal. This correction factor signal is output to a second input of the multiplier block 460, which is operative to multiply the sum signal received from the adder block 440 by the correction factor signal to generate an excursion limiter control signal. An output of the multiplier block 460 is coupled to an input of the excursion limiter block 420, which is configured to apply excursion limiting processing to the delayed input audio signal based on the excursion limiter control signal output by the multiplier block 460. For example, a gain of the excursion limiter block 420 may be adjusted based on the excursion limiter control signal, such that the excursion limiter processing block 420 attenuates the delayed audio input signal to reduce its amplitude to a level that will not cause over-excursion of the cone of the speaker 150. In this way an appropriate level of excursion limitation processing can be applied by the excursion limiter block to protect the speaker 150 from potentially damaging over-excursion due to high input signal levels.

Operation of the feedforward excursion estimator block 430, DC offset compensation block 450, post limiter excursion estimator block 470, oversight correction block 480 and feedback excursion estimate block 490 is controlled based on the state (asserted or de-asserted) of the low power mode state flag.

As will be appreciated by those of ordinary skill in the art, at low input signal levels the risk of speaker over-excursion is small, and so complex processing to achieve highly accurate excursion protection may not be necessary for small input signals. Thus, when the low power mode state flag is asserted, the excursion protection block can enter a low power mode of operation in which one or more of the feedforward excursion estimator block 430, DC offset compensation block 450, post limiter excursion estimator block 470, oversight correction block 480 and feedback excursion estimate block 490 are disabled, to reduce the power consumption of the excursion protection block 400. In this low power mode of operation of the excursion protection block 400, the gain of the excursion limiter block 420 is set to 1, such that no attenuation is applied to the delayed input audio signal when the low power mode state flag is asserted. Internal state values of the disabled blocks are held (e.g. stored in memory, registers or the like), such that when the low power mode state flag is de-asserted the excursion protection block 400 is able to resume normal operation quickly. It will be noted that the delay/lookahead block 410 and the excursion limiter block 420 continue normal operation when the low power state active flag is asserted, and thus audible artefacts such as clicks or pops or other artefacts are not generated when transitioning between low power and normal operating states of the excursion protection block 400.

Additionally or alternatively, in the low power mode of operation a processing rate of one or more of the feedforward excursion estimator block 430, DC offset compensation block 450, post limiter excursion estimator block 470, oversight correction block 480 and feedback excursion estimate block 490 may be reduced. In some examples the processing rate of the block is reduced, but the number of samples processed by the block does not change, such that, for example, a set of samples that would take 1 ms for the block to process in a normal mode of operation would take 2 ms to process in the low power mode. In other examples the processing rate of the block is reduced and the samples passed to the block are downsampled by a downsampling factor that corresponds to the reduction in the processing rate (e.g. if the processing rate is halved, a downsampling factor of 2 is applied to the samples to be processed), such that fewer samples are processed by the block in a given period in the low power mode than in the normal mode of operation.

In examples in which the excursion protection block 400 is configured to perform sub-band processing (and thus comprises sub-blocks for processing different sub-bands of the input audio signal), individual ones of the sub-blocks can be disabled or made to operate at a lower processing rate in the low power mode of operation, such that some sub-bands are not processed, or are processed at a lower rate in the low power mode, while other sub-bands are processed at a normal processing rate.

It will be recalled that the state (asserted or de-asserted) of low power mode state flag is controlled by the low power mode activation block 360, which de-asserts the low power mode activation flag if either the first threshold logic block output signal or the second threshold logic block output signal is in the second state (e.g. is at a logic high level), indicating that the mean power of the input audio signal has reached the first threshold and/or the peak power of the input audio signal has reached the second threshold.

Thus, resumption of normal operation of the excursion protection block 400 can be triggered by de-assertion of the low power mode active flag in response to a sudden or rapid increase in the level of the input audio signal, thereby protecting the speaker from over-excursion in the event of such an increase in the input audio signal level.

Once both the mean power and the peak power of the input signal have dropped below their respective thresholds, the low power mode active flag can again be asserted, causing the excursion protection block to enter its low power mode of operation in which one or more of the feedforward excursion estimator block 430, DC offset compensation block 450, post limiter excursion estimator block 470, oversight correction block 480 and feedback excursion estimate block 490 are disabled to reduce the power consumption of the excursion protection block 400.

Figure 5:
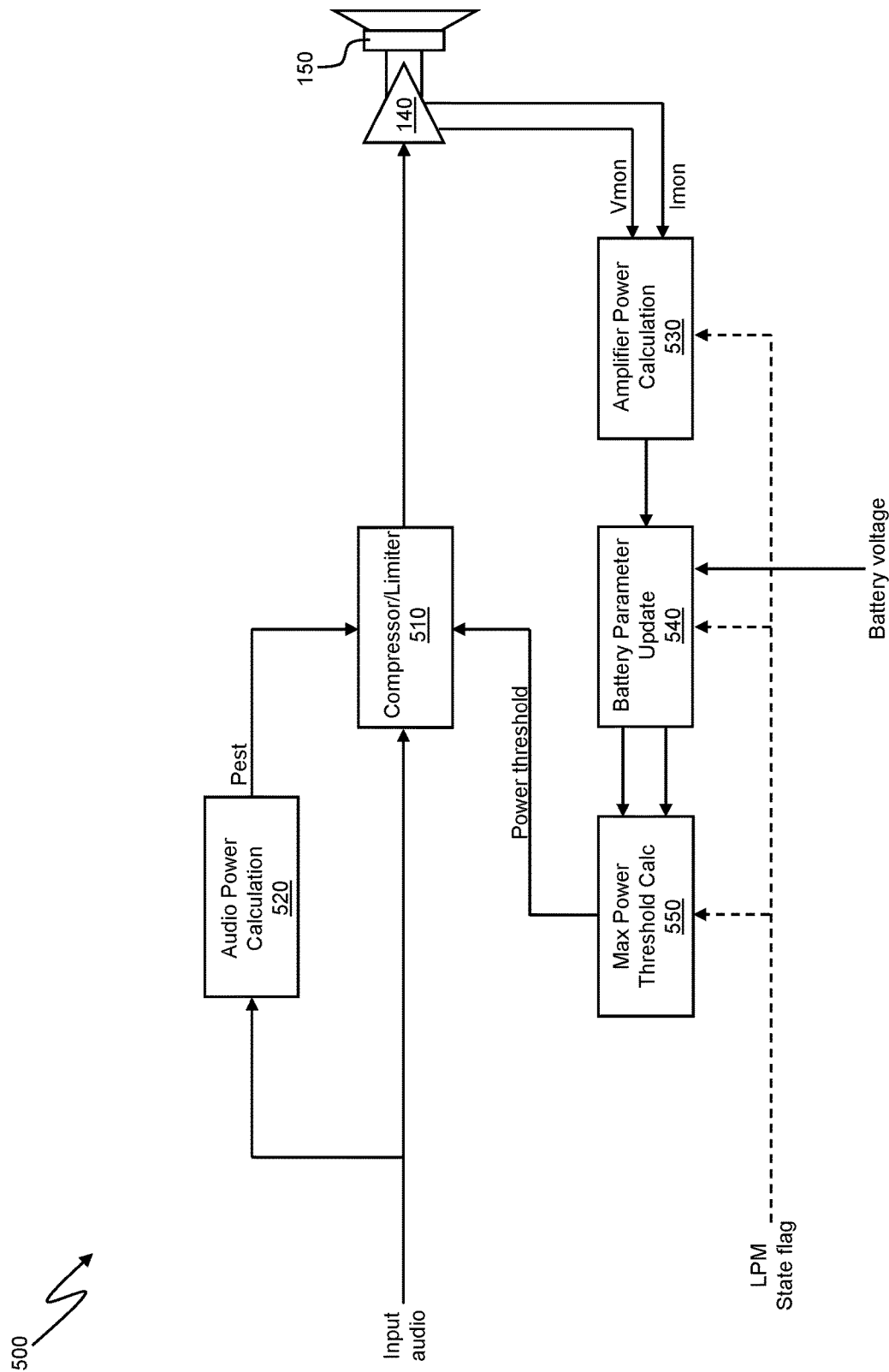
FIG. 5 is a schematic representation of a battery protection block whose operation can be controlled or adjusted based on an output of a power management system according to the present disclosure.

FIG. 5 is a schematic representation of a battery protection block suitable for use as the battery protection block 118 in the DSP 210 of FIG. 2, such that the operation of the excursion protection block can be controlled or adjusted by the SCPM block 220.

The battery protection block, shown generally at 500 in FIG. 5, comprises, in this example, an audio signal path comprising a compressor/limiter block 510, which is configured to receive the input audio signal and to output a processed audio signal to the amplifier 140 for driving the speaker 150. The compressor/limiter block 510 is configured to selectively limit the signal level of the processed audio signal based on power threshold signal, as will be described in more detail below.

The battery protection block 500 further comprises an audio power calculation block 520, configured to receive the input audio signal and generate an audio power estimate signal Pest indicative of a power of the input audio signal. An output of the audio power calculation block 520 is coupled to a first input of the compressor/limiter block 510, such that the audio power estimate signal Pest is received by the compressor/limiter block 510.

The battery protection block 500 further comprises feedback path comprising an amplifier calculation block 530, a battery parameter update block 540 and a maximum power threshold calculation block 550. The amplifier calculation block 530, battery parameter update block 540 and maximum power threshold calculation block 550 thus constitute feedback processing blocks of the battery protection block 500.

The amplifier power calculation block 530 is configured to receive feedback signals (e.g. monitored voltage and/or current signals) from the amplifier 140 and to generate an amplifier power estimate signal indicative of an output power of the amplifier 140.

An output of the amplifier power calculation block 530 is coupled to a first input of the battery parameter update block 540, which receives, at a second input thereof, a battery voltage signal indicative of the voltage of the battery that supplies power to the audio system 200. The battery parameter update block 540 is configured to generate and output signals indicative of a battery resistance value (Rbat) and a battery voltage value (Vbat), based on the amplifier output power estimate signal and the battery voltage signal.

Outputs of the battery parameter update block 540 are coupled to inputs of the maximum power threshold calculation block 550, which generates, based on the battery resistance and battery voltage, a maximum power threshold signal indicative of a maximum power threshold for the input audio signal. An output of the maximum power threshold signal calculation block is coupled to a second input of the compressor/limiter block 510, such that the maximum power threshold signal is output to the compressor/limiter block 510.

The compressor/limiter block 510 is configured to compare the estimated power of the input audio signal (as represented by the audio power estimate signal Pest) to the maximum power threshold (as represented by the maximum power threshold signal) and to apply attenuation to the input audio signal if the estimated power of the input audio signal is equal to or greater than the maximum power threshold.

Operation of the amplifier power calculation block 530, battery parameter update block 540 and maximum power threshold calculation block 550 is controlled based on the low power mode state flag.

As will be appreciated by those of ordinary skill in the art, at low input signal levels, the battery power level will be within acceptable limits, so no attenuation need be applied by the compressor/limiter block 510. Thus, when the low power active state flag is asserted, the battery protection block may enter a low power mode of operation, in which one or more of the amplifier power calculation block 530, battery parameter update block 540 and maximum power threshold calculation block 550 are be disabled to reduce the power consumption of the battery protection block 500. The gain of the compressor/limiter block 510 in the low power mode is set to 1, so that no attenuation is applied to the input audio signal. Internal state values of the disabled blocks are held (e.g. stored in memory, registers or the like), such that when the low power mode state flag is de-asserted the battery protection block 500 is able to resume normal operation quickly. It will be noted that the compressor/limiter block 510 continues normal operation in the low power mode, and thus audible artefacts such as clicks or pops or other artefacts are not generated when transitioning between the low power and normal operating modes of the battery protection block 500.

Additionally or alternatively, in the low power mode of operation a processing rate of one or more of the amplifier power calculation block 530, battery parameter update block 540 and maximum power threshold calculation block 550 may be reduced. In some examples the processing rate of the block is reduced, but the number of samples processed by the block does not change, such that, for example, a set of samples that would take 1 ms for the block to process in a normal mode of operation would take 2 ms to process in the low power mode. In other examples the processing rate of the block is reduced and the samples passed to the block are downsampled by a downsampling factor that corresponds to the reduction in the processing rate (e.g. if the processing rate is halved, a downsampling factor of 2 is applied to the samples to be processed), such that fewer samples are processed by the block in a given period in the low power mode than in the normal mode of operation.

In examples in which the battery protection block 500 is configured to perform sub-band processing (and thus comprises sub-blocks for processing different sub-bands of the input audio signal), individual ones of the sub-blocks can be disabled or made to operate at a lower processing rate in the low power mode of operation, such that some sub-bands are not processed, or are processed at a lower rate in the low power mode, while other sub-bands are processed at a normal processing rate.

It will be recalled that the state (asserted or de-asserted) of the low power mode state flag is controlled by the low power mode activation block 360, which de-asserts the low power mode activation flag if either the first threshold logic block output signal or the second threshold logic block output signal is in the second state (e.g. is at a logic high level), indicating that the mean power of the input audio signal has reached the first threshold and/or the peak power of the input audio signal has reached the second threshold.

Thus, resumption of normal operation of the battery protection block 500 can be triggered by de-assertion of the low power mode active flag in response to a sudden or rapid increase in the level of the input audio signal, thereby protecting the battery from excessive demand in the event of such an increase in the input audio signal level. On resumption of normal operation, the battery resistance value Rbat and the battery voltage value Vbat are reset to initial values (e.g. predefined values or values that were calculated or otherwise determined and stored during a calibration or initialisation process for the DSP 210). This prevents under-estimation of the maximum power threshold and over-compression/over-attenuation of the input audio signal when the battery protection block 500 resumes normal operation when the low power mode active flag is de-asserted.

Once both the mean power and the peak power of the input signal have dropped below their respective thresholds, the low power mode active flag can again be asserted, causing the battery protection block 500 to enter the low power mode of operation in which one or more of the amplifier power calculation block 530, battery parameter update block 540 and maximum power threshold calculation block 550 are disabled or operate at a lower processing rate to reduce the power consumption of the battery protection block 500.

Figure 6:
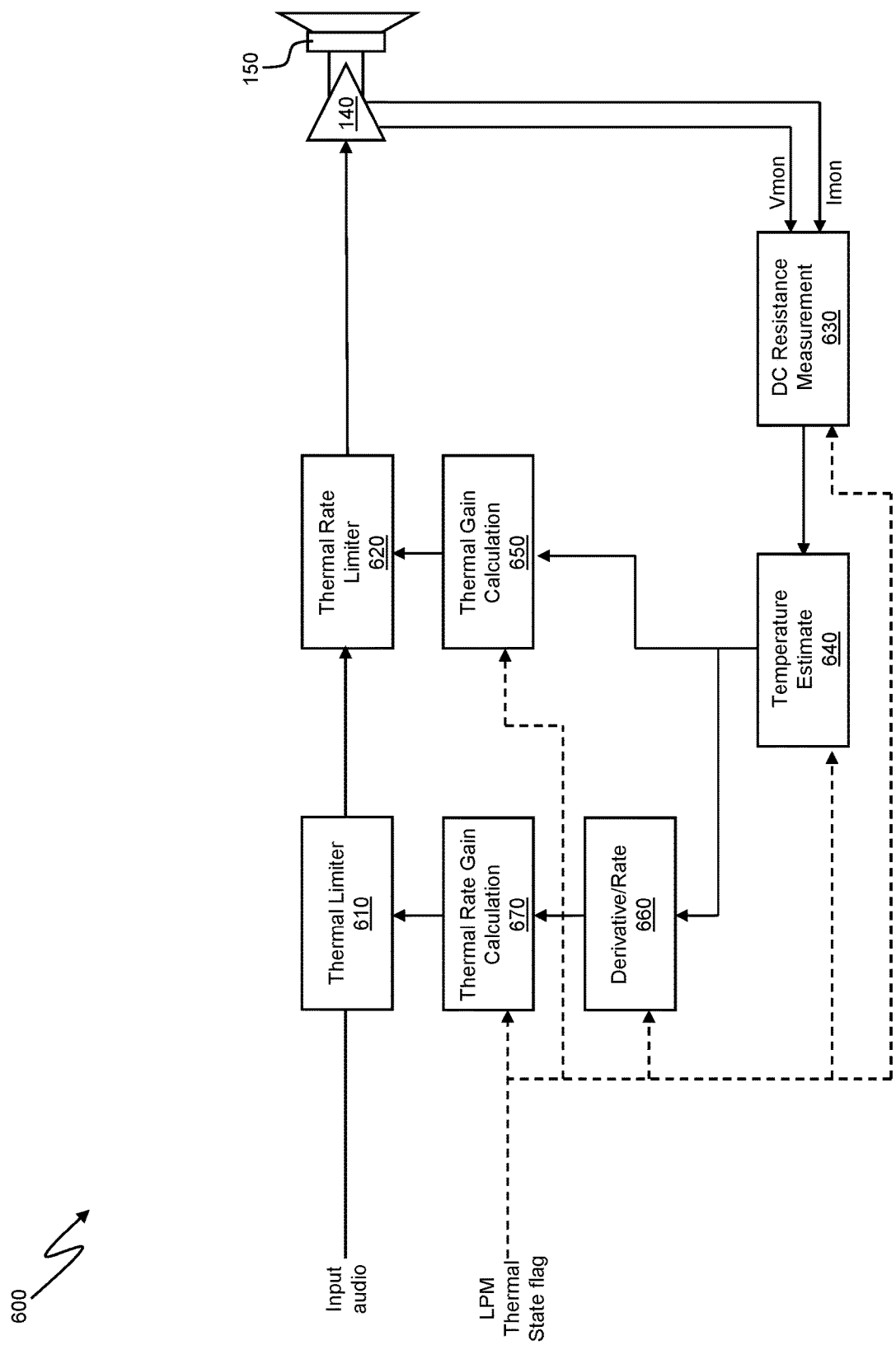
FIG. 6 is a schematic representation of a thermal protection block whose operation can be controlled or adjusted based on an output of a power management system according to the present disclosure.

FIG. 6 is a schematic representation of a thermal protection block suitable for use as the thermal protection block 116 in the DSP 210 of FIG. 2, such that the operation of the thermal protection block can be controlled or adjusted by the SCPM block 220.

The thermal protection block, shown generally at 600 in FIG. 6, comprises, in this example, an audio signal path comprising a thermal limiter block 610 and a thermal rate limiter block 620.

The thermal protection block 600 further comprises a feedback path comprising a DC resistance measurement block 630, a temperature estimator block 640, a thermal gain calculation block 650, a derivative/rate calculation block 660 and a thermal rate gain calculation block 670. The DC resistance measurement block 630, temperature estimator block 640, thermal gain calculation block 650, derivative/rate calculation block 660 and thermal rate gain calculation block 670 thus constitute feedback processing blocks of the thermal protection block 600.

The DC resistance measurement block 630 is configured to receive feedback signals (e.g. monitored voltage and/or current signals) from the amplifier 140 and to generate, based on the received feedback signals, a DC resistance estimate signal indicative of a DC resistance of the speaker 150.

An output of the DC resistance measurement block 630 is coupled to an input of the temperature estimator block 640, which is configured to generate, based on the DC resistance estimate signal, a main voice coil temperature estimate signal indicative of a temperature of a main voice coil of the speaker 150.

An output of the temperature estimator block 640 is coupled to an input of the derivative/rate block 660 and to an input of a thermal gain calculation block 650.

The thermal gain calculation block 650 is configured to generate, based on the main voice coil estimate signal, a thermal gain signal indicative of a thermal gain of the main voice coil. The thermal gain signal is output to the thermal rate limiter block 620, which is configured to apply attenuation to limit a level of an audio signal output to the amplifier based on the thermal gain signal.

The derivative/rate block 660 is configured to generate a derivative/rate signal indicative of a rate of change of the temperature of the main voice coil of the speaker 150. The derivative/rate signal is output to the thermal rate gain calculation block 670, which is configured to generate, based on the derivative/rate signal, a thermal rate gain signal indicative of a rate of change of a thermal gain of the main voice coil of the speaker 150. The thermal rate gain signal is output to the thermal limiter block 610, which is configured to apply attenuation to limit a level of the input audio signal based on the thermal rate gain signal.

Thus, the thermal protection block 600 is configured to selectively limit a level of a signal that is supplied to the amplifier 140 in order to prevent damage to the main voice coil of the speaker 150 that may arise as a result of excessive input signal levels.

As will be appreciated by those of ordinary skill in the art, at low input signal levels, the risk that the temperature of the main voice coil of the speaker 150 will reach potentially damaging levels is reduced. Thus, when the low power mode thermal state flag is asserted, the thermal protection block may enter a low power mode of operation, in which one or more of the DC resistance measurement block 630, temperature estimator block 640, thermal gain calculation block 650, derivative/rate block 660 and thermal rate gain calculation block 670 are disabled to reduce the power consumption of the thermal protection block 600. The gain of the thermal limiter block 610 and the thermal rate limiter block 620 may be set to 1 in the low power mode of operation, so that no attenuation is applied to the input audio signal. Internal state values of the disabled blocks are held (e.g. stored in memory, registers or the like), such that when the low power mode state flag is de-asserted the thermal protection block 600 is able to resume normal operation quickly. It will be noted that the thermal limiter block 610 and the thermal rate limiter block 620 continue normal operation (i.e. are not disabled) when the low power mode thermal state flag is asserted, and thus audible artefacts such as clicks or pops or other artefacts are not generated when transitioning between the low power and normal operating states of the thermal protection block 600.

Additionally or alternatively, in the low power mode of operation a processing rate of one or more of the DC resistance measurement block 630, temperature estimator block 640, thermal gain calculation block 650, derivative/rate block 660 and thermal rate gain calculation block 670 may be reduced. In some examples the processing rate of the block is reduced, but the number of samples processed by the block does not change, such that, for example, a set of samples that would take 1 ms for the block to process in a normal mode of operation would take 2 ms to process in the low power mode. In other examples the processing rate of the block is reduced and the samples passed to the block are downsampled by a downsampling factor that corresponds to the reduction in the processing rate (e.g. if the processing rate is halved, a downsampling factor of 2 is applied to the samples to be processed), such that fewer samples are processed by the block in a given period in the low power mode than in the normal mode of operation.

In examples in which the thermal protection block 600 is configured to perform sub-band processing (and thus comprises sub-blocks for processing different sub-bands of the input audio signal), individual ones of the sub-blocks can be disabled or made to operate at a lower processing rate in the low power mode of operation, such that some sub-bands are not processed, or are processed at a lower rate in the low power mode, while other sub-bands are processed at a normal processing rate.

It will be recalled that operation of the thermal protection block is controlled or adjusted based on the state of the low power mode thermal state flag, which is in turn dependent upon the detected mean power of the input signal. As the temperature of the main voice coil of the speaker 150 varies over longer time periods than the excursion of the speaker 150 (i.e. it takes longer for the main voice coil temperature to change than it does for the excursion of the speaker 150 to change), the operation of the thermal protection block 600 can be controlled based only on the mean power of the input audio signal.

Thus, when the low power mode thermal state flag is asserted (indicating that the signal indicative of the mean power estimate is lower than the third threshold), one or more of the DC resistance measurement block 630, temperature estimator block 640, thermal gain calculation block 650, derivative/rate block 660 and thermal rate gain calculation block 670 can be disabled or set to a lower processing rate, such that the thermal protection block 600 operates in its low power mode, whereas when the low power mode thermal state flag is asserted (indicating that the signal indicative of the mean power estimate is equal to or greater than the third threshold), the thermal gain calculation block 650, derivative/rate block 660 and thermal rate gain calculation block 670 are enabled or set to their normal processing rates, such that the thermal protection block 600 operates in a normal mode.

Thus, resumption of normal operation of the thermal protection block 600 can be triggered by a transition in the third threshold logic block output signal from its first state to its second state in response to an increase in the average power of the input audio signal, thereby protecting the main voice coil of the speaker 150 from damage that could otherwise arise due to an elevated temperature of the voice coil.

Figure 7:
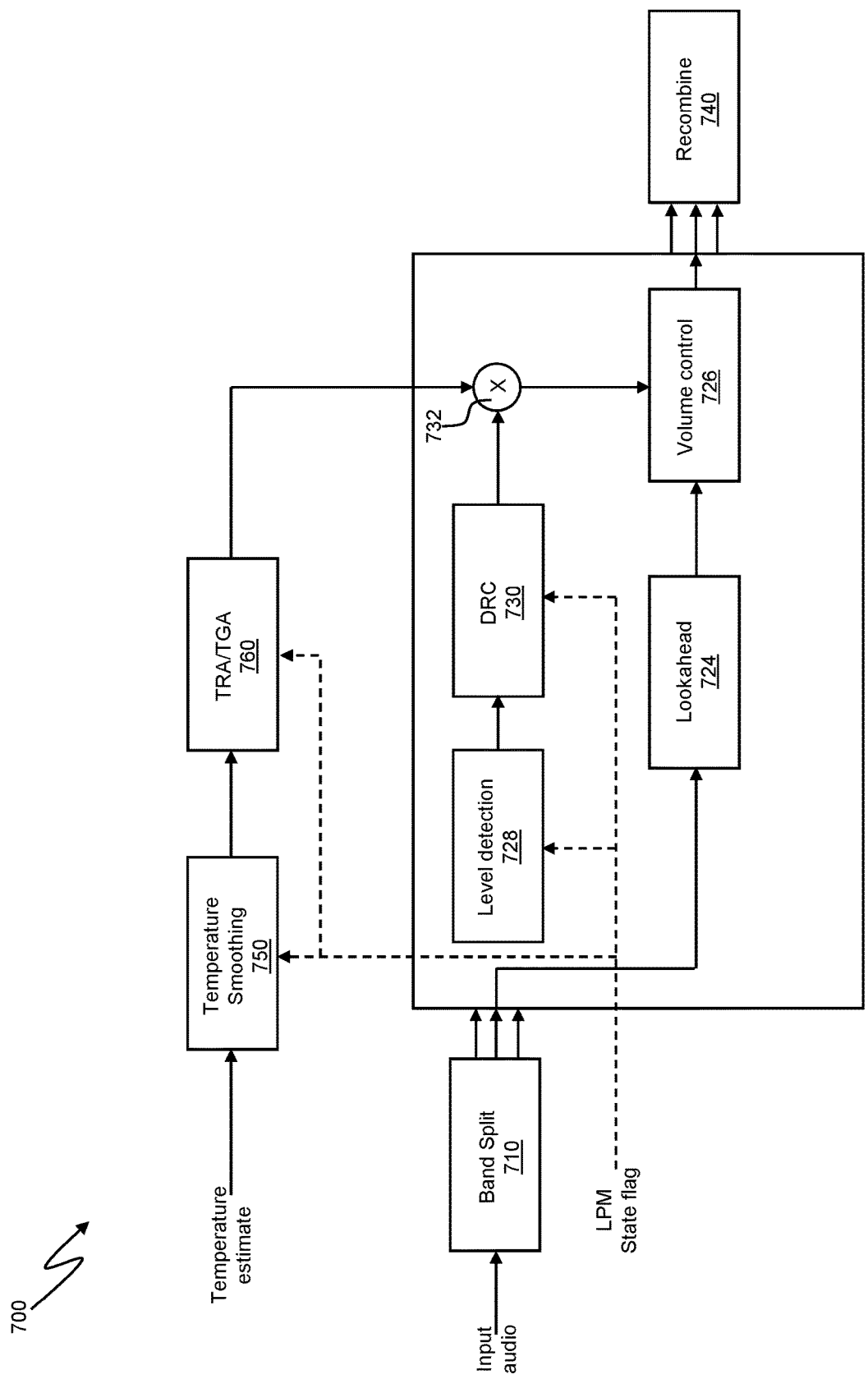
FIG. 7 is a schematic representation of a power optimiser block whose operation can be controlled or adjusted based on an output of a power management system according to the present disclosure.

FIG. 7 is a schematic representation of a power optimiser block suitable for use as the power optimiser block 120 in the DSP 210 of FIG. 2, such that the operation of the power optimiser block can be controlled or adjusted by the SCPM block 220.

The power optimiser block, shown generally at 700 in FIG. 7, comprises, in this example, an audio signal path comprising a band splitter block 710, a plurality of multi-band dynamic range compressor (MBDRC) blocks 720 and a recombiner block 740.

The band splitter block 710 is configured to receive an input audio signal and to output a plurality (e.g. two or three) of different audio band signals, each containing signal components of the input audio signal in a different frequency band.

The MBDRC block 720 comprises a plurality (equal to the number of different audio band signals generated by the band splitter block 710, e.g. two or three) of dynamic range compressor system blocks (DRC) 722. Note that for clarity only one DRC system block 722 is shown in FIG. 7. Each DRC system block 722 includes a lookahead block 724, a volume control block 726, a level detection block 728, a dynamic range compressor (DRC) block 730 and a multiplier block 732.

The lookahead block 724 of each DRC system block 722 is configured to monitor the relevant one of the audio band signals, and to output a lookahead block output signal to a first input of the volume control block 726, such that the volume (e.g. signal level) of a signal output by the volume control block 726 can be adjusted, if necessary, to limit or otherwise manage power consumption of the DSP 210.

The level detection block 728 of each DRC system block 722 is configured to detect a level of the relevant one of the audio band signals and to output a level detection block output signal indicative of the detected level to the DRC block 730. The DRC block 730 is configured to generate a DRC block output signal indicative of an audio band gain to be applied to the relevant one of the audio band signals. The DRC block output signal is output to a first input of the multiplier block 732.

The temperature smoothing block 750 is configured to receive a signal indicative of a temperature of the voice coil of the speaker 150, and to output a smoothed temperature signal to the TRA/TGA block 760. The TRA/TGA block 760 is configured to generate a TRA/TGA block output signal indicative of a temperature compensating gain to be applied to the relevant one of the audio band signals to limit, compensate for or otherwise manage the temperature of the voice coil of the speaker 150. The TRA/TGA block output signal is output to a second input of the multiplier block 732.

An output of the multiplier block 732 is coupled to a second input of the volume control block 726, such that the volume control block 726 receives a volume control signal representing the product of the audio band gain and the temperature compensating gain. The volume control block 726 adjusts the volume (level) of the received audio band signal based on the received volume control signal, and outputs the adjusted audio band signal to the recombiner block 740, which combines the plurality of processed audio band signals to generate an audio output signal.

As will be appreciated by those of ordinary skill in the art, at low input signal levels the risk that the temperature of the main voice coil of the speaker 150 will reach potentially damaging levels is reduced, and there may be no need for dynamic range compression of any of the audio signal bands of the input signal. Thus, when the low power mode active flag is asserted, the power optimiser block 700 may enter a low power mode of operation, in which one or more of the level detection block 728 (of each DRC system block 722), the DRC block 730 (of each DRC system block 722), the temperature smoothing block 750 and the TRA/TGA block 760 may be disabled or may operate at a reduced processing rate to reduce the power consumption of the power optimiser block 700.

The gain of each volume control block 726 in the low power mode is set to 1, so that no attenuation is applied to any of the audio signal bands of the input audio signal. Internal state values of the disabled blocks are held (e.g. stored in memory, registers or the like), such that when the low power mode state flag is de-asserted the power optimiser block 700 is able to resume normal operation quickly. It will be noted that each lookahead block 724 and each volume control block 726 continue normal operation in the low power mode, and thus audible artefacts such as clicks or pops or other artefacts are not generated when transitioning between the low power and normal operating modes of the power optimiser block 700.

In examples in which the power optimiser block 700 is configured to perform sub-band processing (and thus comprises sub-blocks for processing different sub-bands of the input audio signal), individual ones of the sub-blocks can be disabled or made to operate at a lower processing rate in the low power mode of operation, such that some sub-bands are not processed, or are processed at a lower rate in the low power mode, while other sub-bands are processed at a normal processing rate.

FIG. 8 is a schematic representation of a power limiter system block suitable for use in the DSP 210 of FIG. 2, such that the operation of the volume control block can be controlled or adjusted by the SCPM block 220.

The power limiter system block, shown generally at 800 in FIG. 8, comprises, in this example, an audio signal path comprising a volume control block 810 configured to receive an input audio signal and to adjust its volume, based on a gain adaptation control signal, to generate and output a volume-controlled audio signal.

The power limiter system block 800 further comprises a power estimator block 820 configured to estimate a power of the input audio signal, and to output a power estimate signal indicative of the estimated power of the input audio signal to a first input of a gain adaptation block 830. As shown in FIG. 8, the power estimator block 820 may receive a feedforward signal (the input audio signal) and/or one or more feedback signals (e.g. monitored voltage and/or current signals) from the amplifier 140, and is configured to generate the power estimate signal based on the received feedforward and/or feedback signals.

The power limiter system block 800 further comprises a temperature threshold block 840 configured to determine if a speaker coil threshold temperature has been, or is likely to be reached, and to output a temperature threshold signal to the gain adaptation block 830.

The gain adaptation block 830 is configured to generate the gain adaptation signal based on the received power estimate and temperature threshold signals, such that the volume of the input audio signal can be reduced if the input signal power and/or the speaker coil temperature may reach damaging levels. The gain adaptation signal is output to the volume control block 810, which adjusts the volume of the received input audio signal based on the gain adaptation signal.

At low input signal levels the input signal power and voice coil temperature will be within safe limits, and thus when the low power mode thermal state flag is asserted the power limiter system block 800 may enter a low power mode of operation, in which one or more of the power estimator block 820, temperature threshold block 840 and gain adaptation block 830 are disabled or operate at a reduced processing rate to reduce the power consumption of the power limiter system block 800. The volume control block 810 continues to operate as normal in the low power mode, and thus audible artefacts such as clicks or pops or other artefacts are not generated when transitioning between the low power and normal operating modes of the volume control system block 800.

In examples in which the power limiter system block 800 is configured to perform sub-band processing (and thus comprises sub-blocks for processing different sub-bands of the input audio signal), individual ones of the sub-blocks can be disabled or made to operate at a lower processing rate in the low power mode of operation, such that some sub-bands are not processed, or are processed at a lower rate in the low power mode, while other sub-bands are processed at a normal processing rate.

In the examples described above, the mode of operation (normal or low power) of one or more of the blocks 112-122 is controlled based on the low power mode state flag or the low power mode thermal state flag. The state (asserted or de-asserted) of the low power mode state flag is set based on the result of a comparison of the smoothed mean power estimate (which is indicative of the mean power of the input signal) to the first threshold, or the result of a comparison of the peak power estimate (which is indicative of the peak power of the input signal) to the second threshold. Similarly, the state (asserted or de-asserted) of the low power mode thermal state flag is set based on the result of a comparison of the smoothed mean power estimate to the third threshold.

An alternative approach, which is also encompassed by the present disclosure, is to set the state of the low power mode state flag and/or the low power mode thermal state flag based on a volume setting of a host device incorporating the DSP 210. As will be appreciated by those of ordinary skill in the art, such a volume setting is a parameter that is indicative of a power of an input signal to the DSP 210.

The volume setting, and/or a parameter derived from the volume setting (e.g. an integral of the volume setting over a defined period of time) may be compared to one or more thresholds to determine whether the low power mode state flag and/or the low power mode thermal state flag should be asserted or de-asserted. For example, if either the volume setting is less than a first volume setting threshold, or if the integral of the volume setting is less than a second volume setting threshold, the low power mode state flag may be asserted. On the other hand, if the volume setting is equal to or greater than the first volume setting threshold, and if the integral of the volume setting is equal to or greater than the second volume setting threshold, the low power mode state flag may be de-asserted.

Similarly, if the integral of the volume setting is less than a third volume setting threshold, the low power mode thermal state flag may be asserted, whereas if the integral of the volume setting is equal to or greater than the third volume setting threshold, the low power mode thermal state flag may be de-asserted.

In examples that employ the alternative approach described above, the mode of operation of one or more of the processing blocks 112-122 is controlled based on the state of the low power mode state flag or the low power mode thermal state flag as described above with reference to FIGS. 4-8.

As will be apparent from the foregoing discussion, the power management system of the present disclosure facilitates reduced power consumption at low input signal levels, whilst permitting rapid resumption of normal operation of the various DSP blocks, such that operation of important systems (e.g. excursion protection, battery protection and thermal protection) is not compromised.

As will be noted from the above description, only sidechain blocks of the DSP 210 are disabled in the various low power modes; the main audio signal processing chain continues to operate as normal when the various DSP blocks are operating in their low power modes, and is thus unaffected by the SCPM 220. Thus, generation of audible artefacts such as clicks and pops can be avoided, and the time taken for an audio signal to travel through the main audio signal processing chain is unaffected by the various low power modes of the DSP blocks.

The power management system, DSP and circuitry described above with reference to the accompanying drawings may be incorporated in a host device such as a laptop, notebook, netbook or tablet computer, a gaming device such as a games console or a controller for a games console, a virtual reality (VR) or augmented reality (AR) device, a mobile telephone, a portable audio player or some other portable device, or may be incorporated in an accessory device for use with a laptop, notebook, netbook or tablet computer, a gaming device, a VR or AR device, a mobile telephone, a portable audio player or other portable device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A power management system for managing power consumption of a digital signal processor (DSP) that implements a protection system, wherein the DSP comprises a plurality of distinct processing blocks, each configured to perform a particular function, the power management system comprising:
a power management block configured to:
detect a parameter indicative of a power of an input signal to the DSP and control a mode of operation of the plurality of distinct processing blocks based on the detected parameter;
wherein the power management block is configured to:
compare the detected parameter to a threshold; and
responsive to a determination that the detected parameter is less than the threshold, cause one or more of the plurality of distinct processing blocks of the DSP to enter a low power mode of operation.

2. The power management system of claim 1, wherein the power management block is configured to detect a peak power of the input signal.

3. The power management system of claim 2, wherein the power management block is configured to compare a signal indicative of the peak power of the input signal to a first threshold and, responsive to a determination that the peak power of the input signal is less than the first threshold, cause an excursion protection block to enter a low power mode of operation.

4. The power management system of claim 3, wherein in the low power mode, one or more feedforward processing blocks or one or more feedback processing blocks of the excursion protection block are disabled.

5. The power management system of claim 3, wherein in the low power mode, a processing rate of one or more feedforward processing blocks or one or more feedback processing blocks of the excursion protection block is reduced.

6. The power management system of claim 2, wherein the power management block is configured to compare a signal indicative of the peak power of the input signal to a first threshold and, responsive to a determination that the peak power of the input signal is less than the first threshold, cause a battery protection block to enter a low power mode of operation.

7. The power management system of claim 6, wherein in the low power mode, one or more feedback processing blocks of the battery protection block are disabled.

8. The power management system of claim 6, wherein in the low power mode, a processing rate of one or more feedback processing blocks of the battery protection block is reduced.

9. The power management system of claim 1, wherein the power management block is configured to detect a mean power of the input signal.

10. The power management system of claim 9, wherein the power management block is configured to compare a signal indicative of the mean power of the input signal to a second threshold and, responsive to a determination that the mean power of the input signal is less than the second threshold, cause a thermal protection block to enter a low power mode of operation.

11. The power management system of claim 10, wherein in the low power mode, one or more feedback processing blocks of the thermal protection block are disabled.

12. The power management system of claim 10, wherein in the low power mode, a processing rate of one or more feedback processing blocks of the thermal protection block is reduced.

13. The power management system of claim 2, wherein the power management block is configured to compare a signal indicative of the peak power of the input signal to a first threshold and, responsive to a determination that the peak power of the input signal is less than the first threshold, cause a power optimiser block or a power limiter system block of the DSP to enter a low power mode of operation.

14. The power management system of claim 1, wherein the DSP comprises a main audio signal chain, and wherein operation of the main audio signal chain is unaffected by the power management block.

15. The power management system of claim 1, wherein the DSP comprises the power management block.

16. The power management system of claim 1, wherein the parameter is based, at least in part, on a level of a level of the input signal.

17. The power management system of claim 1, wherein the parameter is based, at least in part, on a volume setting of a host device incorporating the power management system.

18. The power management system of claim 1, wherein the DSP is configured to implement a speaker protection system or a battery protection system.

19. A digital signal processor (DSP) integrated circuit (IC) comprising a plurality of distinct processing blocks, each configured to perform a particular function, wherein the DSP IC comprises a power management block configured to:
   detect a parameter indicative of a power of an input signal to the DSP IC and control a mode of operation of the plurality of distinct processing blocks based on the detected parameter;
   wherein the power management block is configured to:
   compare the detected parameter to a threshold; and
   responsive to a determination that the detected parameter is less than the threshold, cause one or more of the plurality of distinct processing blocks of the DSP to enter a low power mode of operation.

20. A host device comprising:
   a digital signal processor (DSP) that implements a protection system; and
   a power management system for managing power consumption of the DSP, wherein the DSP comprises a plurality of distinct processing blocks, each configured to perform a particular function,
   and wherein the power management system comprises:
a power management block configured to:
   detect a parameter indicative of a power of an input signal to the DSP and control a mode of operation of the plurality of distinct processing blocks based on the detected parameter, wherein the power management block is configured to:
   compare the detected parameter to a threshold; and
   responsive to a determination that the detected parameter is less than the threshold, cause one or more of the plurality of distinct processing blocks of the DSP to enter a low power mode of operation.

21. A host device according to claim 20, wherein the host device comprises a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

22. A digital signal processor (DSP) comprising:
   an excursion protection block;
   a battery protection block;
   a thermal protection block; and
   a power management block,
wherein the power management block is configured to:
   monitor a peak power and a mean power of an input signal to the DSP;
   control a mode of operation of the excursion protection block or the battery protection block based on the peak power of the input signal; and
   control a mode of operation of the thermal protection block based on the mean power of the input signal.

* * * * *